United States Patent
Nakano et al.

(10) Patent No.: US 12,294,542 B2
(45) Date of Patent: May 6, 2025

(54) WIRELESS COMMUNICATION CONTROL DEVICE AND WIRELESS COMMUNICATION CONTROL METHOD TO COORDINATE REFERENCE SIGNAL WAVEFORMS

(71) Applicant: Panasonic Intellectual Property Corporation of America, Torrance, CA (US)

(72) Inventors: Takayuki Nakano, Ishikawa (JP); Hiroyuki Kanaya, Ishikawa (JP); Yoshio Urabe, Nara (JP); Ryutaro Hashi, Ishikawa (JP); Jun Minotani, Ishikawa (JP); Takashi Iwai, Ishikawa (JP); Tomofumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/769,296

(22) PCT Filed: Sep. 4, 2020

(86) PCT No.: PCT/JP2020/033583
§ 371 (c)(1),
(2) Date: Apr. 14, 2022

(87) PCT Pub. No.: WO2021/084910
PCT Pub. Date: May 6, 2021

(65) Prior Publication Data
US 2024/0146476 A1    May 2, 2024

(30) Foreign Application Priority Data
Nov. 1, 2019    (JP) .................. 2019-199720

(51) Int. Cl.
*H04B 7/06*    (2006.01)
*H04B 7/08*    (2006.01)
(Continued)

(52) U.S. Cl.
CPC ........... *H04L 5/005* (2013.01); *H04B 7/0684* (2013.01); *H04B 7/0851* (2013.01);
(Continued)

(58) Field of Classification Search
CPC . H04L 27/261; H04L 27/2613; H04L 1/0079; H04L 27/26035; H04B 7/0684; H04B 7/0851
See application file for complete search history.

(56) References Cited

U.S. PATENT DOCUMENTS

2015/0295629 A1    10/2015    Xia et al.
2017/0026142 A1*    1/2017    Kim .................... H04L 12/1895
(Continued)

FOREIGN PATENT DOCUMENTS

EP    3806345 A1 *    4/2021    .......... H04B 7/0617
WO    2019/051338 A1    3/2019

OTHER PUBLICATIONS

Al-Ghazu, N., "A Study of the Next WLAN Standard: IEEE 802.11ac Physical Layer," doc.: XR-EE-SB 2013:001, Master of Science Thesis, Stockholm, Sweden, Jan. 2013 (59 pages).
(Continued)

*Primary Examiner* — Salvador E Rivas
(74) *Attorney, Agent, or Firm* — Seed IP Law Group LLP

(57) ABSTRACT

This wireless communication control device is a first wireless control device provided with: a control circuit that causes the waveform of a reference signal transmitted to a wireless communication device in coordination with a second wireless communication control device to differ, either in the frequency domain or the time domain, from the
(Continued)

waveform of a reference signal transmitted to the wireless communication device by the second wireless communication control device; and a transmission circuit that transmits the reference signal.

13 Claims, 14 Drawing Sheets

(51) Int. Cl.
      *H04L 5/00*          (2006.01)
      *H04L 27/26*       (2006.01)
      *H04W 72/0453*    (2023.01)
      *H04W 72/51*      (2023.01)
      *H04L 1/00*         (2006.01)

(52) U.S. Cl.
     CPC ....... *H04L 27/261* (2013.01); *H04W 72/0453* (2013.01); *H04W 72/51* (2023.01); *H04L 1/0079* (2013.01)

(56) References Cited

U.S. PATENT DOCUMENTS

| | | | |
|---|---|---|---|
| 2018/0145854 A1* | 5/2018 | Akkarakaran | H04L 27/261 |
| 2018/0234217 A1* | 8/2018 | Aboul-Magd | H04L 5/005 |
| 2019/0081664 A1* | 3/2019 | Vermani | H04L 5/0035 |
| 2021/0168005 A1* | 6/2021 | Zuo | H04L 27/2695 |
| 2021/0195591 A1* | 6/2021 | Li | H04L 5/0007 |
| 2022/0078884 A1* | 3/2022 | Liang | H04W 72/0453 |

OTHER PUBLICATIONS

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Std 802.11™-2016 (Revision of IEEE Std 802.11-2012), 2016 (3534 pages).

International Search Report, mailed Nov. 24, 2020, for International Application No. PCT/JP2020/033583 (5 pages including translation).

LAN/MAN Standards Committee, "IEEE P802.11ax/D4.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE Computer Society, Feb. 2019. (746 pages).

Liu et al., Mediatek Inc., "Joint Sounding for Multi-AP Systems," doc.: IEEE 802.11-19/1593r1, Sep. 12, 2019 (18 pages).

Park et al., LG Electronics, "Multi-AP Transmission Procedure," doc.: IEEE 802.11-19/0448r1, Mar. 11, 2019 (18 pages).

Suh et al., Huawei, "Sounding for AP Collaboration," doc.: IEEE 802.11-19/1535r0, Sep. 16, 2019 (11 pages).

Extended European Search Report, dated Jan. 23, 2023, for corresponding European Patent Application No. 20880750.3-1203. (9 pages).

Park et al., LG Electronics, "Multi-AP Transmission Procedure," IEEE 802.11-19/0448r0, Mar. 11, 2019. (18 pages).

* cited by examiner

FIG. 2

| Total number of space-time streams ($N_{STS,total}$) | Cyclic shift for space-time stream n (ns) | | | | | | | |
|---|---|---|---|---|---|---|---|---|
| | 1 | 2 | 3 | 4 | 5 | 6 | 7 | 8 |
| 1 | 0 | – | – | – | – | – | – | – |
| 2 | 0 | –400 | – | – | – | – | – | – |
| 3 | 0 | –400 | –200 | – | – | – | – | – |
| 4 | 0 | –400 | –200 | –600 | – | – | – | – |
| 5 | 0 | –400 | –200 | –600 | –350 | – | – | – |
| 6 | 0 | –400 | –200 | –600 | –350 | –650 | – | – |
| 7 | 0 | –400 | –200 | –600 | –350 | –650 | –100 | – |
| 8 | 0 | –400 | –200 | –600 | –350 | –650 | –100 | –750 |

$T_{CS,VHT}(n)$ values for the VHT modulated fields of a PPDU

FIG. 10

| | POWER DIFFERENCE BETWEEN EHT-STF AND EHT-LTF (AGC PERFORMANCE) | TIMING DETECTION |
|---|---|---|
| METHOD X (EHT-STF: UNDIVIDED, EHT-LTF: DIVIDED) | POOR | GOOD |
| METHOD 2 | GOOD | FAIR |
| METHOD 3 | FAIR | GOOD |

FIG. 14

Association Request frame body

| Order | Information | Notes |
|---|---|---|
| 43 | HE Capabilities | The HE Capabilities element is present if dot11HEOptionImplemented is true; otherwise it is not present. |
| 44 | Channel Switch Timing | The Channel Switch Timing element is optionally present if dot11HESubchannelSelectiveTransmissionImplemented is true; otherwise it is not present. |
| 45 | HE Extended Capabilities | The HE Extended Capabilities element is present if dot11HEOptionImplemented and dot11GOptionImplemented are true; otherwise it is not present. |
| 46 | UL MU Power Capabilities | The UL MU Power Capability element is optionally present if dot11HEOptionImplemented is true; otherwise it is not present. |
|  | EHT-STF format | Specify EHT-STF format-type |

FIG. 15

WIRELESS COMMUNICATION CONTROL DEVICE AND WIRELESS COMMUNICATION CONTROL METHOD TO COORDINATE REFERENCE SIGNAL WAVEFORMS

TECHNICAL FIELD

The present disclosure relates to a radio communication control apparatus and a radio communication control method.

BACKGROUND ART

The standardization of technical specification for 802.11be (hereinafter, referred to as "11be") has been in progress as a successor standard for 802.11ax (hereinafter, referred to as "11ax"), which is a standard of the Institute of Electrical and Electronics Engineers (IEEE) 802.11.

In 11be, application of coordinated communication has been discussed, in which a plurality of radio communication control apparatuses on a data transmission side (e.g., access points (APs) or base stations) coordinate with each other to transmit data to a radio communication apparatus on a reception side (e.g., or station (STAs) or terminal).

CITATION LIST

Non Patent Literature

NPL 1
IEEE 802.11-19/0448r1, Multi-AP Transmission Procedure, 2019 Mar. 11
NPL 2
IEEE 802.11-19/1535r0, Sounding for AP Collaboration, 2019 Sep. 16
NPL 3
A Study of the Next WLAN Standard IEEE 802.11ac Physical Layer, Section 3.3.1
NPL 4
IEEE Std 802.11-2016
NPL 5
IEEE P802.11ax/D4.0, February 2019

SUMMARY OF INVENTION

A transmission method of a reference signal in coordinated communication, however, has not been sufficiently discussed.

One non-limiting and exemplary embodiment of the present disclosure facilitates providing a radio communication control apparatus and a radio communication control method each enabling appropriate transmission of a reference signal in coordinated communication.

A radio communication control apparatus according to one example of the present disclosure includes: control circuitry, which, in operation, makes a waveform of a reference signal to be transmitted in coordination with a second radio communication control apparatus to a radio communication apparatus, different, in at least one of a frequency domain and a time domain, from a waveform of the reference signal to be transmitted by the second radio communication control apparatus to the radio communication apparatus; and transmission circuitry, which, in operation, transmits the reference signal.

It should be noted that general or specific embodiments may be implemented as a system, an apparatus, a method, an integrated circuit, a computer program, a storage medium, or any selective combination thereof.

According to an exemplary embodiment of the present disclosure, it is made possible to appropriately transmit a reference signal in coordinated communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 illustrates exemplary formats of Multi-AP Null Data Packet (MAP NDP);

FIG. 10 illustrates an exemplary cyclic shift value to a total number of transmit chains;

FIG. 14 illustrates comparative examples of power differences between the EHT-STFs and the EHT-LTFs and the timing-detection results; and FIG. 15 illustrates an example of Association Request format.

DESCRIPTION OF EMBODIMENTS

Hereinafter, an embodiment of the present disclosure will be described in detail with reference to the accompanying drawings.

Coordination Communication Schemes

In 11be, application of a DL Multi-AP coordination (hereinafter, referred to as "downlink coordinated communication") has been discussed, in which a plurality of radio communication control apparatuses on a signal transmission side, performs coordinated transmission of data to a radio communication apparatus on a reception side, for example. Note that, a radio communication control apparatus is also referred to as an "Access Point (AP)" or a "base station," and a radio communication apparatus is also referred to as a "terminal" or a "station (STA)."

In the downlink coordinated communication, processing such as selecting a coordinated communication scheme or acquiring beamforming information in an AP is performed based on, for example, information relating to reception quality of a signal (including, e.g., reference signal or known signal) received by each STA from each of the plurality of APs (hereinafter referred to as "reception quality information"). For example, the STA measures reception quality based on a signal received from an AP (e.g., reference signal or known signal) and transmits (i.e., feedbacks) the reception quality information to the APs.

Further, the STA measures the reception quality for a transmission source AP based on, for example, a reference signal for preamble (hereinafter also referred to as a "preamble reference signal") transmitted from the AP. Incidentally, the preamble reference signal is, for example, a reference signal included (i.e., mapped) in a preamble. In the downstream coordinated communication in 11be, a preamble reference signal for 11be has been discussed, which is an extension of a preamble reference signal defined in 11ax. The preamble reference signal for 11ax is also referred to as, for example, a "high efficiency short training field (HE-STF)" and a "high efficiency long training field (HE-LTF)," while the preamble reference signal for 11be is also referred to as, for example, "EHT-STF" and "EHT-LTF."

Meanwhile, for example, APs that perform the downlink coordinated communication include an AP for controlling coordinated communication (e.g., also referred to as "Master AP" or "M-AP") and an AP for performing coordinated control by receiving a control signal transmitted from the Master AP (e.g., also referred to as "Slave AP" or "S-AP").

Figure 1:
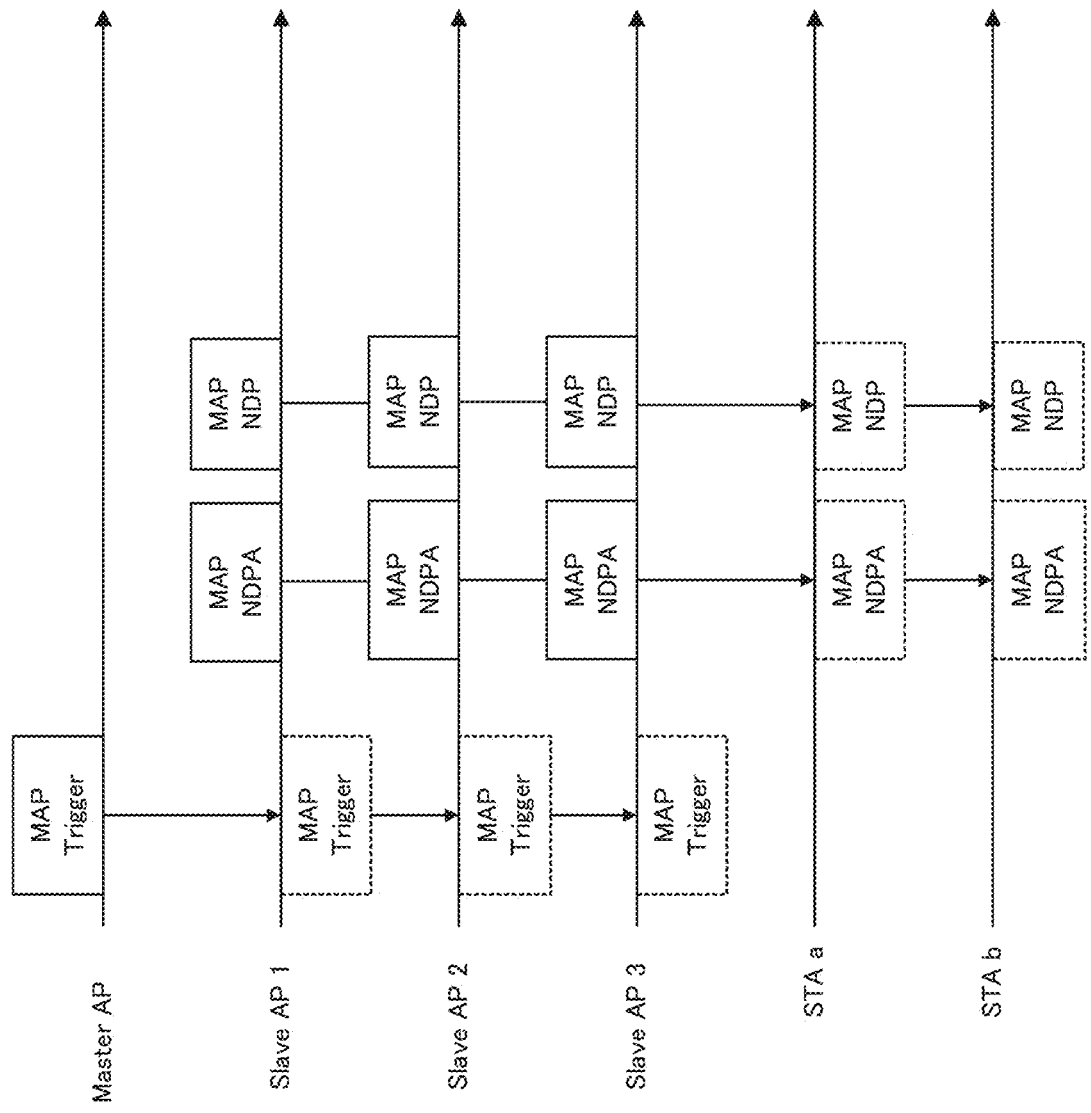
FIG. 1 illustrates exemplary coordination communication scheme.

FIG. 1 illustrates exemplary coordination communication scheme. In FIG. 1, an example is illustrated in which three Slave APs (e.g., Slave AP 1, Slave AP 2, and Slave AP 3) coordinating under the control of the Master AP transmit signals (e.g., MAP NDPs) including preamble reference signals to STA a and STA b.

For example, in FIG. 1, the Master AP transmits, to Slave AP 1, Slave AP 2, and Slave AP 3, a trigger (e.g., MAP Trigger) regarding a start of the downlink coordinated communication. Transmission of MPA trigger makes an indication of, to the Slave APs, for example, a control signal and a transmission timing for coordinated transmission of packets (e.g., MAP NDPs) including the preamble reference signals (e.g., EHT-STFs and EHT-LTFs). In FIG. 1, Slave AP 1, Slave AP 2, and Slave AP 3 transmit, to STA a and STA b, packets including control information for the STAs (e.g., MAP NDP announcements (MAP NDPAs), and MAP NDPs, for example. STA a and STA b measure reception quality between the STAs and the Slave APs based on, for example, the preamble reference signals included in MAP NDPs transmitted from each of the Slave APs and transmit the reception quality information (not illustrated) to the Slave APs.

For example, in the downlink coordinated communication in 11be, a scheme has been proposed in which each of the APs transmits an EHT-LTF at the same timing by dividing, among coordinating APs, a frequency resource to which an EHT-LTF used for channel estimation in a STA (i.e., frequency-division of EHT-LTF) is assigned among the preamble reference signals for 11be (e.g., see NPL 1).

Figure 2:
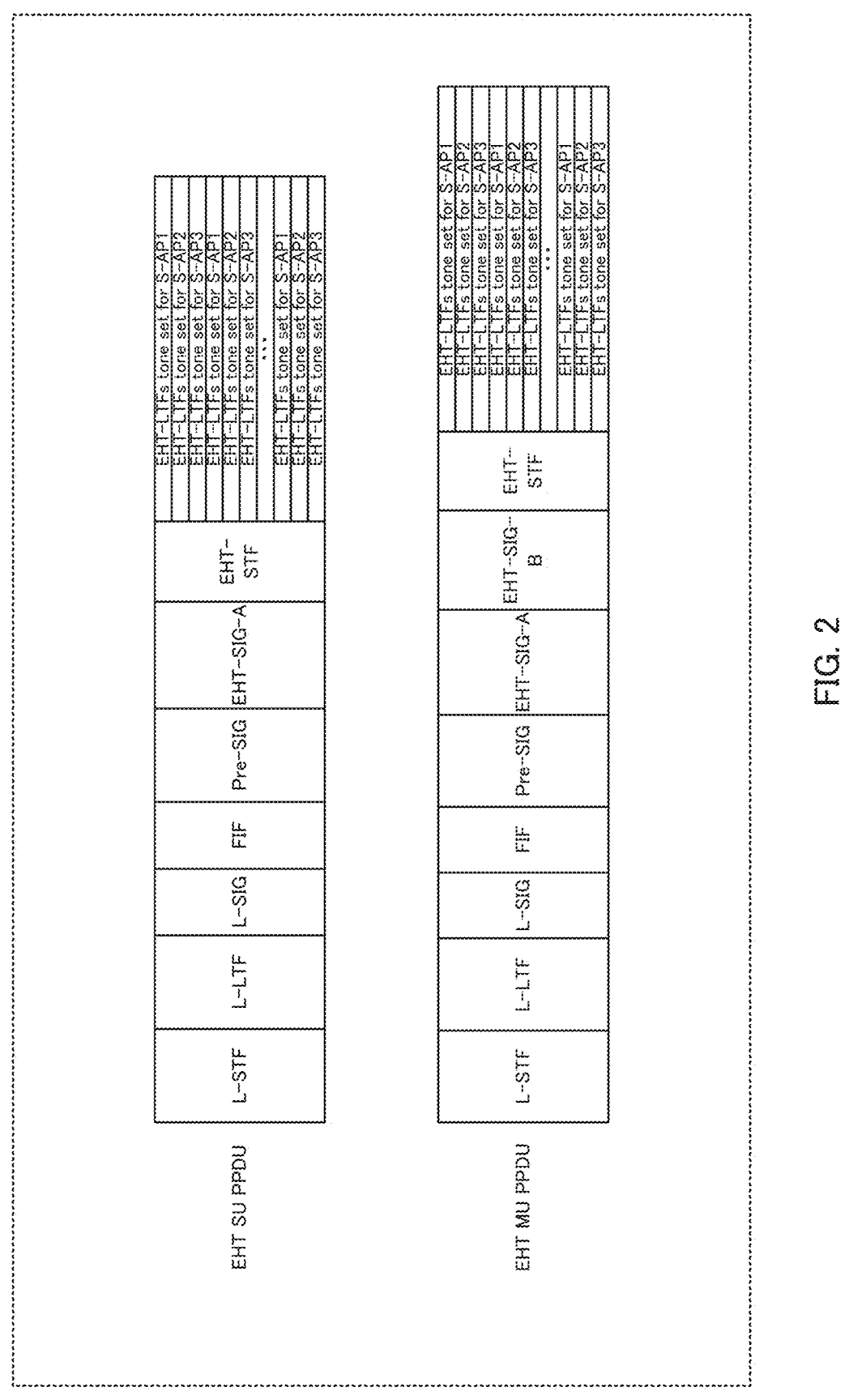

FIG. 2 illustrates, as an example, formats of signals in a time domain (e.g., physical protocol data units (PPDUs) when EHT-LTFs in MAP NDPs are frequency-divided in the three Slave APs illustrated in FIG. 1. FIG. 2 illustrates exemplary formats of EHT single user PPDU (EHT SU PPDU) and EHT multi user PPDU (EHT MU PPDU).

Figure 3:
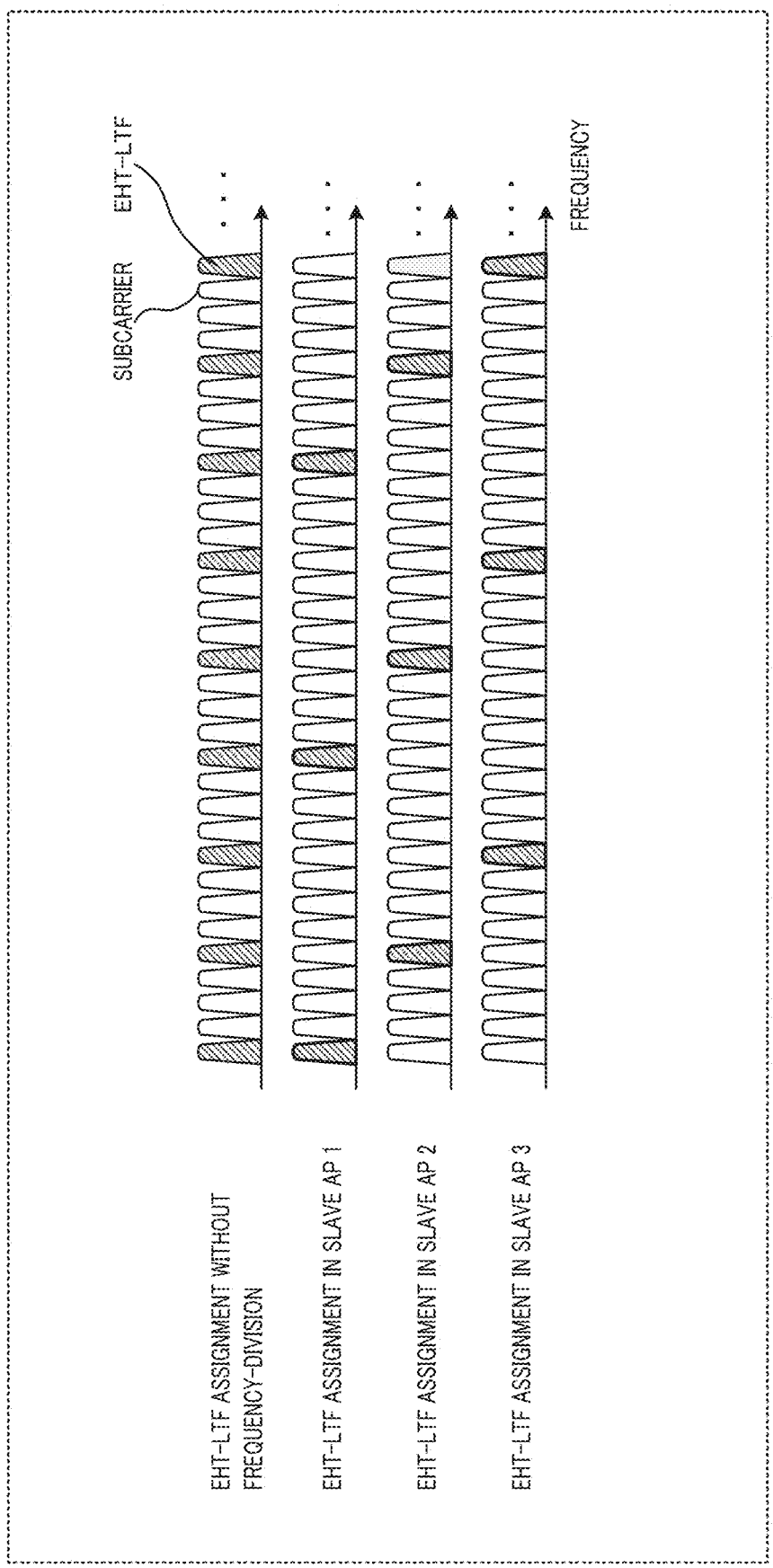
FIG. 3 illustrates frequency-allocation examples for Extreme High Throughput Long Training Fields (EHT-LTFs)

Moreover, FIG. 3 illustrates frequency-allocation examples for EHT-LTFs. FIG. 3 illustrates, as an example, an allocation example for EHT-LTFs without frequency-division and frequency-allocation examples for EHT-LTFs with the frequency-division for the three Slave APs illustrated in FIG. 1.

As illustrated in FIGS. 2 and 3, the EHT-LTFs are assigned to different subcarriers (or also referred to as "tones") for each of the Slave APs in a frequency domain.

Incidentally, as a method for dividing EHT-LTFs for a plurality of APs (e.g., Slave APs), a method based on code-division (e.g., code-division using P-matrix) has also been proposed, in addition to the frequency-division (e.g., see NPL 2).

Further, in 11ax, an HE-STF is inserted into a packet for reduction of automatic-gain control (AGC) distortion in the HE-LTF or for timing detection (e.g., see NPL 3). In 11be, an EHT-STF may be inserted into a packet with the same purpose as in 11ax (e.g., FIG. 2). For example, in the downlink coordinated communication in 11be, the EHT-LTFs are frequency-divided as illustrated in FIG. 2, whereas the EHT-STFs are not frequency-divided, and the same signal can be transmitted among the APs.

In the downlink coordinated communication, however, when a plurality of APs transmits a preamble reference signal having the same waveform (e.g., EHT-STF) at the same timing, for example, depending on a phase relationship of a propagation path, a received signal in an STA is in-phase added or anti-phase added, and a received power may thus greatly vary. Variation in received power in the STAs may cause deterioration of AGC performance, for example.

Therefore, one non-limiting embodiment of the present disclosure will describe methods for suppressing variation in received power of a preamble reference signal in an STA and thus suppressing deterioration of AGC performance, for example. In one example, an embodiment of the present disclosure suppresses the variation in received power in the STAs by transmitting preamble reference signals having different waveforms at each of APs included in downlink coordinated communication.

Configuration of Radio Communication System

A radio communication system according to an embodiment of the present disclosure includes at least two transmission sources (e.g., STAs (including APs)) and one STA. In the downlink coordinated communication, for example, at least two transmission sources (e.g., Slave APs) may perform coordinated transmission of preamble reference signals (e.g., EHT-STFs and EHT-LTFs) to the STA.

In the following description, for example, the term "radio communication control apparatus" corresponds to an AP and the term "radio communication apparatus" corresponds to an STA.

Figure 4:
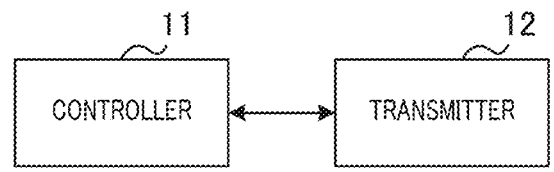
FIG. 4 is a block diagram illustrating a configuration example of a part of a radio communication control apparatus.

FIG. 4 is a block diagram illustrating a configuration example of a part of radio communication control apparatus 10. In radio communication control apparatus 10 illustrated in FIG. 4, controller 11 coordinates with another radio communication control apparatus to make a waveform of a reference signal to be transmitted to the radio communication apparatus (e.g., STA) different from a waveform of a reference signal to be transmitted from the other radio communication control apparatus to the radio communication apparatus in at least one of the frequency domain and the time domain. Transmitter 12 transmits a reference signal.

Configuration of Radio Communication Control Apparatus

Figure 5:
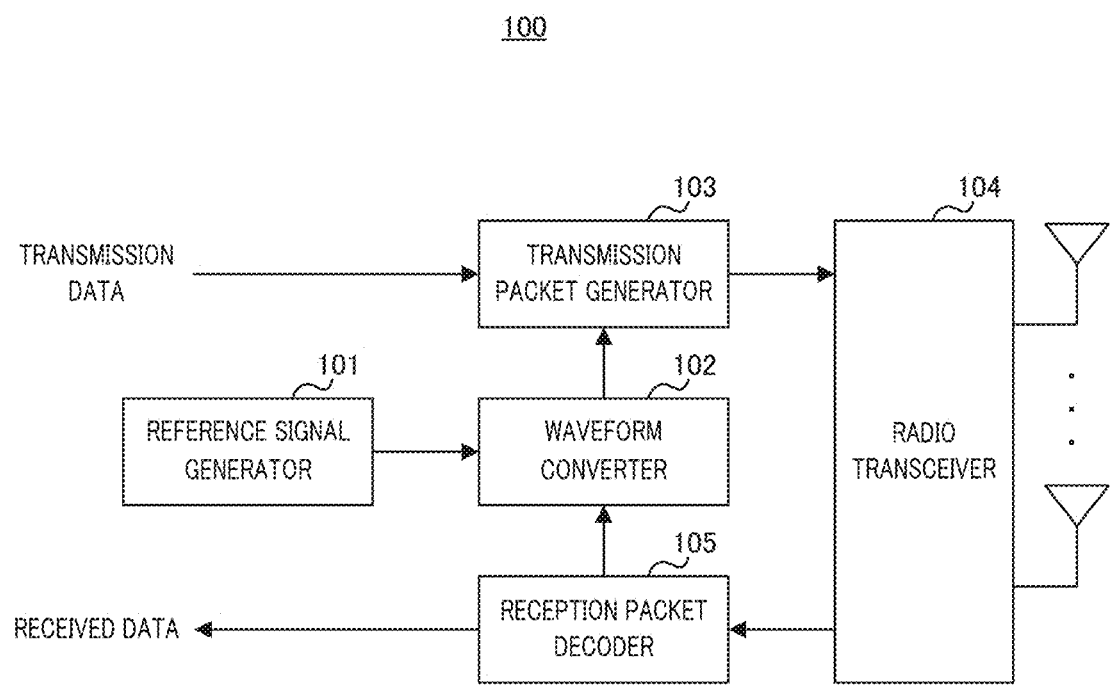
FIG. 5 is a block diagram illustrating a configuration example of a radio communication control apparatus.

FIG. 5 is a block diagram illustrating a configuration example of radio communication control apparatus 100 according to the present embodiment. In FIG. 5, radio communication control apparatus 100 includes reference signal generator 101, waveform converter 102, transmission packet generator 103, radio transceiver 104, and reception packet decoder 105.

Radio communication control apparatus 100 illustrated in FIG. 5 corresponds to an example of radio communication control apparatus 10 illustrated in FIG. 4. Moreover, reference signal generator 101, waveform converter 102, and transmission packet generator 103 in FIG. 5 each may correspond to an example of controller 11 in FIG. 4, and radio transceiver 104 in FIG. 5 may correspond to an example of transmitter 12 in FIG. 4. Furthermore, radio communication control apparatus 100 is, for example, a Master AP or a Slave AP in coordinated communication.

Reference signal generator 101 generates a reference signal (e.g., preamble reference signal). The preamble reference signal may include, for example, at least one of an EHT-STF, an EHT-LTF, a Legacy-STF (L-STF), and an L-LTF. Reference signal generator 101 outputs the generated reference signal to waveform converter 102.

Waveform converter 102 converts a waveform of the reference signal input from reference signal generator 101. For example, in a case where radio communication control apparatus 100 is the Slave AP, waveform converter 102 may convert the waveform of the reference signal based on control information input from reception packet decoder 105 (e.g., control information transmitted from Master AP). Incidentally, the term "waveform-conversion" may refer to processing or control to make two signal waveforms different from each other, or processing or control to generate signals having different waveforms from each other.

For example, the control information transmitted from the Master AP may include information for identifying the Slave AP (e.g., Slave AP number) and information related to the waveform-conversion of the reference signal (hereinafter, referred to as "waveform-conversion parameter"). Waveform converter 102 outputs the reference signal after the waveform conversion to transmission packet generator 103.

Transmission packet generator 103 generates a transmission packet including the reference signal input from waveform converter 102 and transmit data. The transmission packet to be generated may include, for example, at least one of the MAP Trigger, the NDPAs, and the NDPs illustrated in FIG. 1. Transmission packet generator 103 outputs the generated transmission packet to radio transceiver 104.

Radio transceiver 104 performs radio transmission processing on the transmission packet and converts it into a radio transmission signal. Radio transceiver 104 transmits the resultant radio transmission signal from an antenna.

Radio transceiver 104 also receives a radio received signal from the antenna. Radio transceiver 104 performs radio reception processing on the received radio transmission and reception signal and acquires a reception packet. The reception packet may include, for example, the control information transmitted from the Master AP (e.g., MAP Trigger (e.g., FIG. 1)) and a signal (e.g., including reception quality information) transmitted from radio communication apparatus 200 (not illustrated, e.g., STA). Radio transceiver 104 outputs the reception packet to reception packet decoder 105.

Reception packet decoder 105 decodes the reception packet and acquires received data. For example, in a case where radio communication control apparatus 100 is the Slave AP, reception packet decoder 105 may extract the Slave AP number and the waveform-conversion parameter from the MAP Trigger included in the reception packet and may output them to waveform converter 102.

The configuration of radio communication control apparatus 100 has been described above.

Radio communication apparatus 200 (e.g., STA) receives the packet (e.g., MAP NDP) transmitted from radio communication control apparatus 100. For example, radio communication apparatus 200 may control reception of the MAP NDP based on the MAP NDPA that is transmitted prior to the MAP NDP, as illustrated in FIG. 1. Radio communication apparatus 200 extracts a reference signal such as an EHT-STF or an EHT-LTF (e.g., preamble reference signal) when, for example, the reception packet includes the MAP NDP.

Radio communication apparatus 200 may perform timing detection and AGC processing based on, for example, the extracted reference signal. Further, radio communication apparatus 200 may measure, based on, for example, the extracted reference signal, the reception quality (i.e., performs channel estimation) and may transmit (or feedback), to radio communication control apparatus 100, reception quality information on the measured reception quality.

Transmission Method for Reference Signal

Hereinafter, an example of a transmission method for a reference signal (e.g., method for converting waveform) in radio communication control apparatus 100.

For example, radio communication control apparatus 100 (e.g., Slave AP in coordinated communication) transmits reference signals at the same timing in coordinated communication. In the present embodiment, the reference signals (e.g., EHT-STFs) transmitted by a plurality of Slave APs in coordinated communication have, for example, different waveforms among the plurality of Slave APs. In one example, the reference signals having the different waveforms among the plurality of Slave APs are generated by assignment of different subcarriers in the frequency domain or assignment of different delays (i.e., cyclic shifts) in the time domain among the plurality of Slave Aps (an example will be described later).

Meanwhile, a subcarrier interval at which a reference signal is assigned (i.e., allocated or mapped) may be identical (i.e., common) among a plurality of transmission sources (e.g., Slave APs) in coordinated communication. For example, a subcarrier interval at which an EHT-STF is assigned may be a fixed value (e.g., eight subcarriers or 16 subcarriers) or a variable value.

Further, the method for dividing, for each plurality of Slave APs, the resource to which the EHT-LTF included in the transmission packet (e.g., MAP NDP) is assigned may be a frequency-division illustrated in FIG. 2 or FIG. 3, may be a code-division, or may be a division method combining the frequency-division and the code-division.

Methods 1 to 7 for transmitting (or waveform-converting) a reference signal will be described below, respectively.
<Method 1>

In Method 1, preamble reference signals (e.g., EHT-STFs) are frequency-divided for a plurality of transmission sources (e.g., Slave APs). In other words, a frequency resource (e.g., subcarrier) to which an EHT-STF is assigned in a certain AP that is a transmission source is different from a frequency resource to which an EHT-STF is assigned in an AP that is another transmission source.

Figure 6:
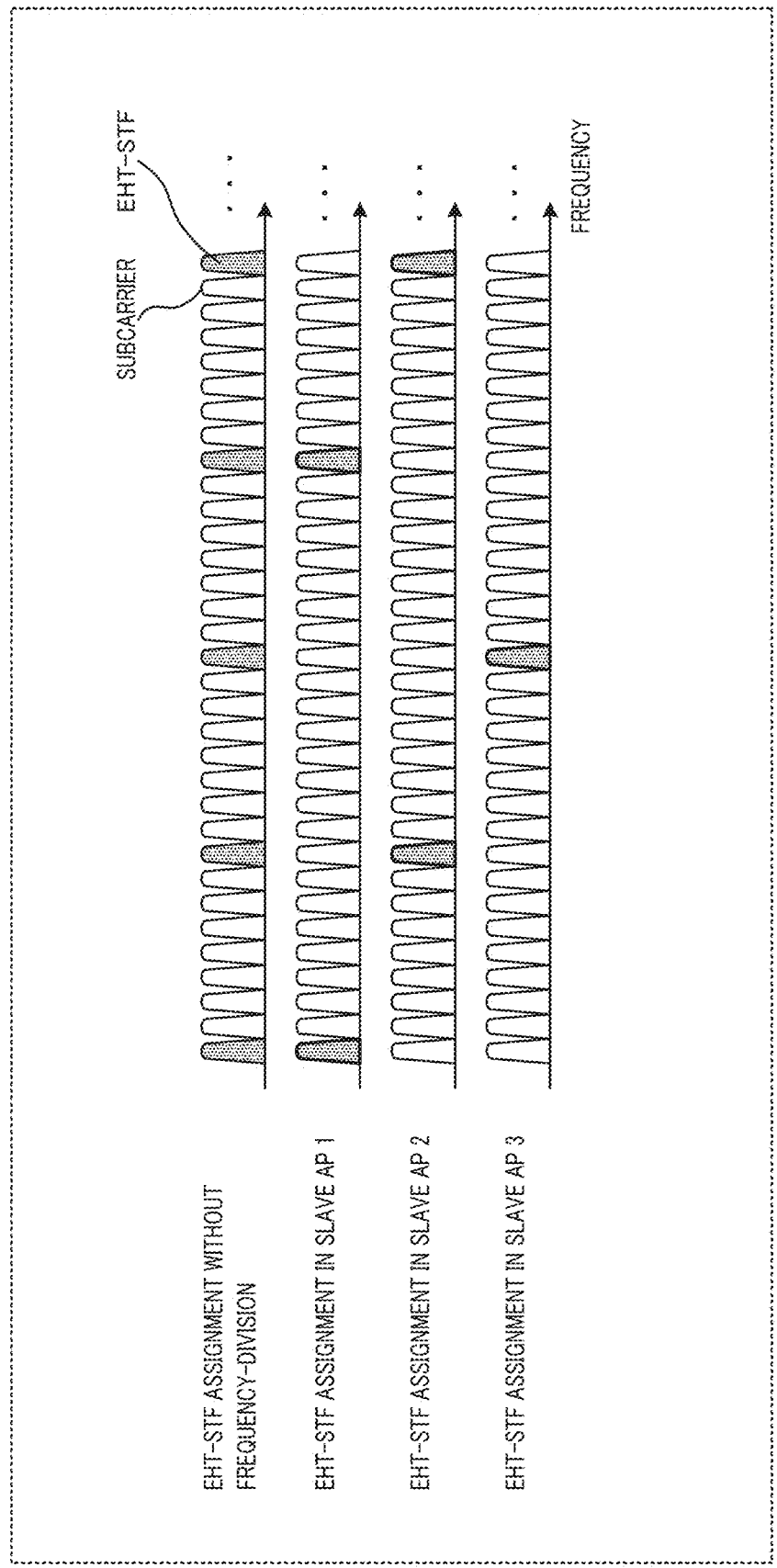
FIG. 6 illustrates frequency-allocation examples for Extreme High Throughput Short Training Fields (EHT-STFs) according to Method 1.

FIG. 6 illustrates frequency-allocation examples for EHT-STFs. In FIG. 6, for example, three Slave APs of Slave AP 1, Slave AP 2, and Slave AP 3 perform coordinated communication.

As illustrated in FIG. 6, when EHT-STFs are not frequency-divided, the EHT-STFs are assigned at intervals of eight subcarriers in the frequency domain. Incidentally, a subcarrier interval at which an EHT-STF is assigned is not limited to eight subcarriers, and may be another interval (e.g., 16 subcarriers).

In Method 1, as illustrated in FIG. 6, the subcarriers to which the EHT-LTFs transmitted from each of the Slave APs are assigned are different from each other. In FIG. 6, a plurality of subcarriers with eight-subcarrier intervals is allocated to EHT-STFs of the three Slave APs performing coordinated communication. That is, in FIG. 6, frequency resources with 24-subcarrier intervals are allocated to the EHT-STFs of each of the Slave APs. With this resource allocation, for example, as illustrated in FIG. 6, the EHT-STFs assigned at intervals of eight subcarriers are transmitted from any one AP of the three Slave APs and not transmitted from the other APs.

Here, as an example, the subcarrier interval of the EHT-STF in the case of no frequency-division is referred to as "numSC," the number of Slave APs performing coordinated communication is referred to as "numAP," the Slave AP number of each Slave AP is referred to as "iAP" (iAP=0, 1, 2 ... numAP−1), and the subcarrier number assigned to an EHT-STF of each Slave AP is referred to as "noSC (iAP, n)" (n=0, 1, 2 ... EHT-STF number−1 assigned to each Slave AP).

In this case, a subcarrier number noSC (iAP, n) assigned to an EHT-STF of each Slave AP may be calculated according to the following equation.

When n=0: noSC (iAP, n)=numSC×iAP
When n≠0: noSC (iAP, n)=noSC (iAP, n−1)+numSC×numAP For example, FIG. 6 illustrates frequency-allocation examples for the EHT-STFs when numSC=8 and numAP=3.

For example, in coordinated communication, a Master AP may transmit, to the Slave APs, the MAP Trigger (FIG. 1) that includes a numAP (i.e., waveform conversion parameter). Meanwhile, the numSC may be indicated from the Master AP to the Slave APs as well, or may be defined in the standard.

Further, the Master AP may also transmit, to the Slave APs, the MAP Trigger while including the Slave AP number iAP Alternatively, the Slave APs may determine the iPA based on the order of Slave APs specified in the MAP Trigger.

Each Slave AP may determine a frequency resource (e.g., subcarrier) to be allocated to the EHT-STF of each Slave AP based on, for example, the waveform-conversion parameter indicated from the Master AP or the defined parameter.

In Method 1, as illustrated in FIG. 6, the subcarriers to which the EHT-STFs of each of the Slave APs are assigned are different from each other. In other words, in FIG. 6, the signal waveforms of the EHT-STFs in the frequency domain transmitted by each of the Slave APs are different from each other. Consequently, according to Method 1, in the STA (e.g., radio communication apparatus 200), it is possible to reduce variation in received power in the EHT-STFs transmitted from a plurality of Slave APs and thus to improve AGC performance.

<Method 2>

In Method 2, as in Method 1, an EHT-STF is frequency-divided for a plurality of transmission sources (e.g., Slave APs).

Moreover, in Method 2, for example, an EHT-LTF is frequency-divided for a Slave AP. That is, a frequency resource (e.g., subcarrier) to which an EHT-LTF is assigned in a certain Slave AP is different from a frequency resource to which an EHT-LTF is assigned in another Slave AP.

Furthermore, in Method 2, for example, in each of a plurality of Slave APs, subcarriers allocated to EHT-LTFs overlap a part of subcarriers allocated to EHT-STFs.

Figure 7:
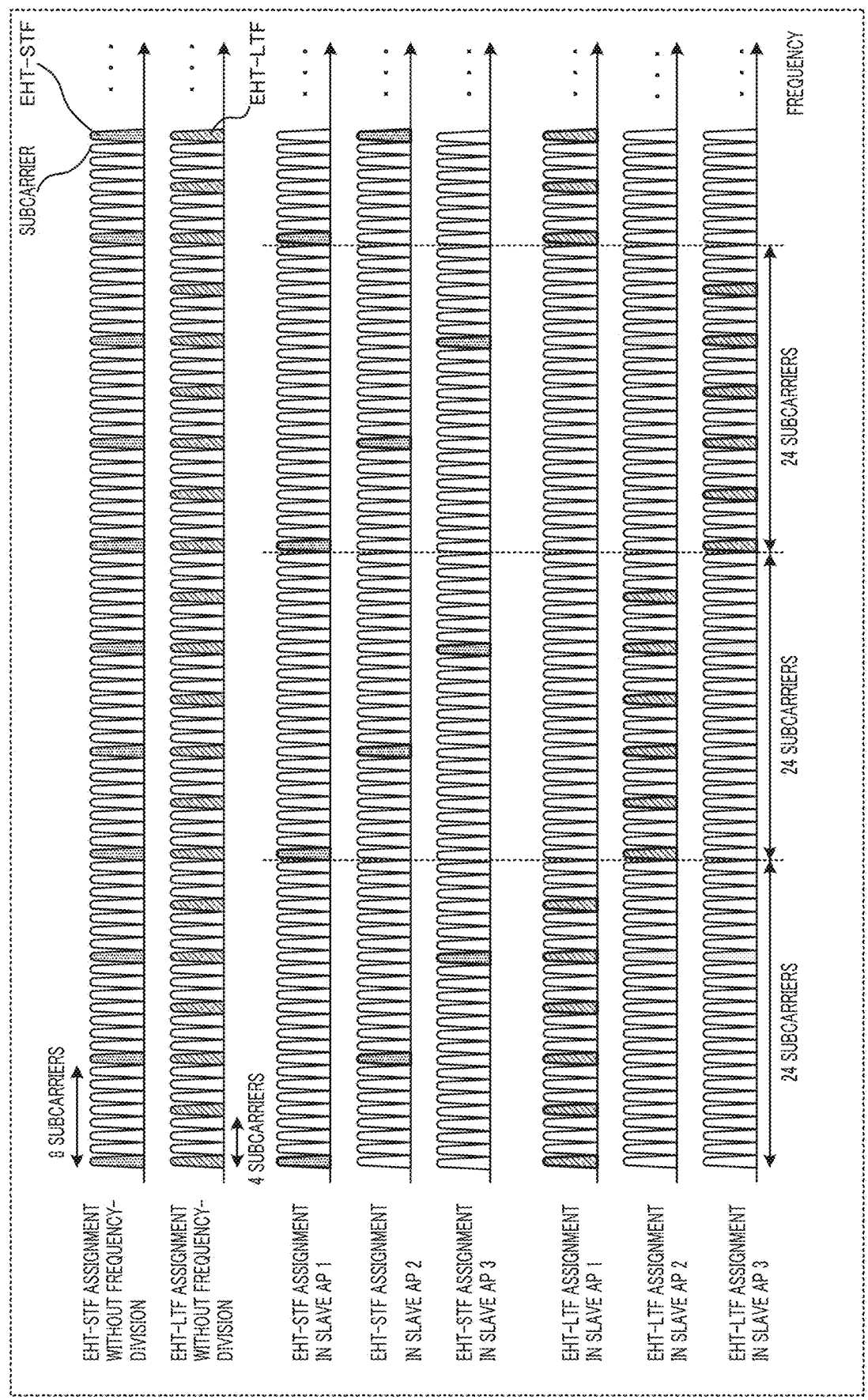
FIG. 7 illustrates frequency-allocation examples for EHT-LTFs and EHT-STFs according to Method 2.

FIG. 7 illustrates frequency-allocation examples for EHT-LTFs and EHT-STFs. In FIG. 7, for example, three Slave APs of Slave AP 1. Slave AP 2, and Slave AP 3 perform coordinated communication.

As illustrated in FIG. 7, when EHT-STFs are not frequency-divided, the EHT-STFs are assigned at intervals of eight subcarriers in the frequency domain. Incidentally, a subcarrier interval at which an EHT-STF is assigned is not limited to eight subcarriers, and may be another interval (e.g., 16 subcarriers).

Further, as illustrated in FIG. 7, when EHT-LTFs are not frequency-divided, the EHT-LTFs are assigned at intervals of four subcarriers in the frequency domain. Incidentally, a subcarrier interval at which an EHT-LTF is assigned is not limited to four subcarriers, and may be another interval (e.g., one or two subcarriers).

In Method 2, similar to Method 1 (e.g., FIG. 6), as illustrated in FIG. 7, a plurality of subcarriers with eight-subcarrier intervals is allocated to each of the EHT-STFs of the three Slave APs performing coordinated communication. That is, in FIG. 7, frequency resources with 24-subcarrier intervals are allocated to the EHT-STFs of each of the Slave APs.

Further, in Method 2, as illustrated in FIG. 7, subcarriers to which the EHT-LTFs transmitted from each of the Slave APs are assigned are different from each other. In FIG. 7, a plurality of subcarriers with four-subcarrier intervals is allocated to EHT-STFs of three Slave APs performing coordinated communication.

For example, in FIG. 7, the subcarriers to which the EHT-LTFs of each of the Slave APs are assigned may be determined based on the Slave AP number according to the coordinated transmission (e.g., three in FIG. 7). For example, subcarrier intervals (i.e., range of frequency resources) at which the EHT-LTFs of each of the Slave APs are assigned may be calculated by "subcarrier interval of EHT-STF×Slave AP number." In FIG. 7, subcarrier intervals of the EHT-STFs are eight subcarriers, and the Slave AP number is three; thus, the subcarrier intervals at which the EHT-LTFs of each of the Slave APs are assigned is 24 subcarriers.

For example, in FIG. 7, since subcarrier intervals of the EHT-LTFs is four subcarriers, six subcarriers adjacent in the frequency domain are allocated to the EHT-LTFs transmitted from each of the Slave APs. With this resource allocation, for example, as illustrated in FIG. 7, the EHT-LTFs assigned with four-subcarrier intervals are transmitted, for every 24 subcarriers, from any one AP of the three Slave APs and not transmitted from the other APs.

For example, in coordinated communication, a Master AP may transmit, to the Slave APs, the MAP Trigger (FIG. 1) that includes the Slave AP number (i.e., waveform conversion parameter). Meanwhile, the subcarrier intervals of the EHT-STFs and the EHT-LTFs may be indicated from the Master AP to the Slave APs or may be defined in the standard, for example.

Further, the Master AP may also transmit, to the Slave APs, the MAP Trigger while including the Slave AP number. Alternatively, the Slave APs may determine the Slave AP number based on the order of Slave APs specified in the MAP Trigger.

Each Slave AP may determine frequency resources (e.g., subcarriers) to be allocated to the EHT-STFs and the EHT-LTFs of each Slave AP based on, for example, the waveform-conversion parameter indicated from the Master AP or the defined parameter.

In Method 2, as illustrated in FIG. 7, the subcarriers to which the reference signals (e.g., EHT-STFs and EHT-LTFs) of each of the Slave APs are assigned are different from each other. In other words, in FIG. 7, the signal waveforms of the reference signals (e.g., EHT-STFs and EHT-LTFs) in the frequency domain transmitted by each of the Slave APs are different from each other. Consequently, according to Method 2, in the STA (e.g., radio communication apparatus 200), it is possible to reduce the variation in received power in the EHT-STFs transmitted from a plurality of Slave APs and thus to improve the AGC performance.

Further, in Method 2, in the reference signals of each of the Slave APs, the EHT-STFs and the EHT-LTFs are related with each other. For example, in each of the Slave APs, the frequency resources (subcarriers) to which the EHT-STFs are assigned and the subcarriers to which the EHT-LTFs are assigned partly overlap (i.e., are identical). In one example, in FIG. 7, in a range of 24-subcarrier to be allocated to the EHT-LTFs of one Slave AP, a subcarrier to which one EHT-LTF is assigned, among six EHT-LTFs, is identical to the subcarrier to which the EHT-STF of the Slave AP is assigned.

This assignment of the reference signals makes frequency characteristics in a propagation path between the Slave APs and the STA similar in a part of the EHT-STFs and the EHT-LTFs, for example. Thus, difference in the received power due to the frequency characteristics of the propagation path can be reduced between the EHT-STFs and the EHT-LTFs, and the AGC performance in the STA can be improved.

Figure 8:
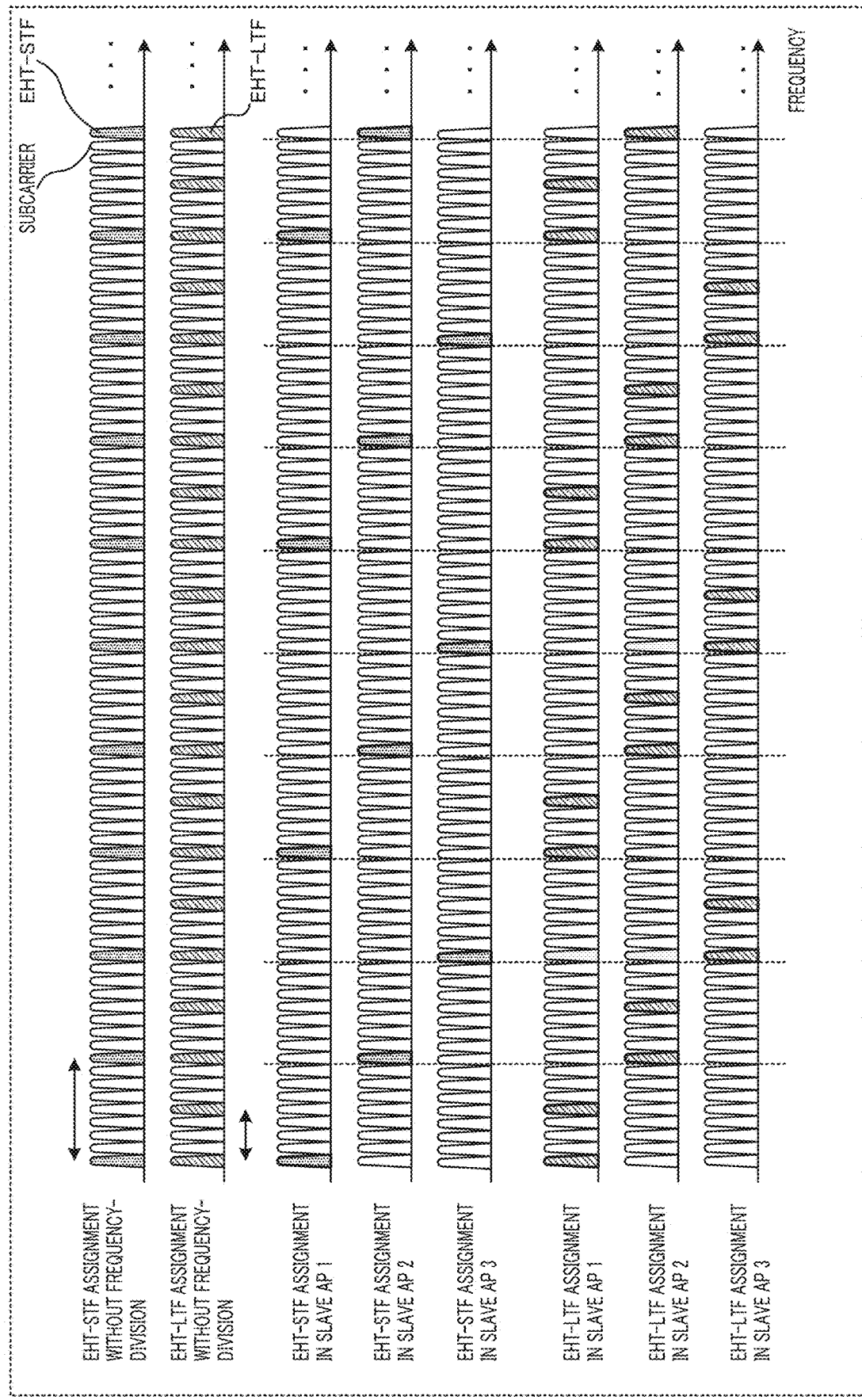
FIG. 8 illustrates other frequency-allocation examples for EHT-LTFs and EHT-STFs according to Method 2.

The frequency-allocation for the EHT-LTFs in Method 2 is not limited to the example illustrated in FIG. 7. For example, the subcarrier (i.e., range of frequency resources) to which an EHT-LTF of each of the Slave APs is assigned may be determined based on the subcarrier interval of the EHT-STF. By way of example, as illustrated in FIG. 8, in a case where the subcarrier intervals of the EHT-STFs is eight subcarriers and the subcarrier intervals of the EHT-LTFs is four subcarriers, subcarrier intervals at which the EHT-LTFs of each of the Slave APs are assigned may be eight subcarriers. In this case, as illustrated in FIG. 8, since the subcarrier intervals of the EHT-LTFs is four subcarriers, two subcarriers adjacent in the frequency domain are allocated to the EHT-LTFs transmitted from each of the Slave APs. Here, as illustrated in FIG. 8, the subcarrier to which one EHT-LTF of the two adjacent EHT-LTFs is assigned is identical to the subcarrier to which an EHT-STF is assigned. Thus, in FIG. 8, the difference in the received power due to the frequency characteristics of the propagation path can be reduced between the EHT-STFs and the EHT-LTFs, and the AGC performance in the STA can be improved.

<Method 3>

In Method 3, EHT-STFs are assigned to subcarriers based on an offset different for each of a plurality of transmission sources (e.g., Slave APs).

Figure 9:
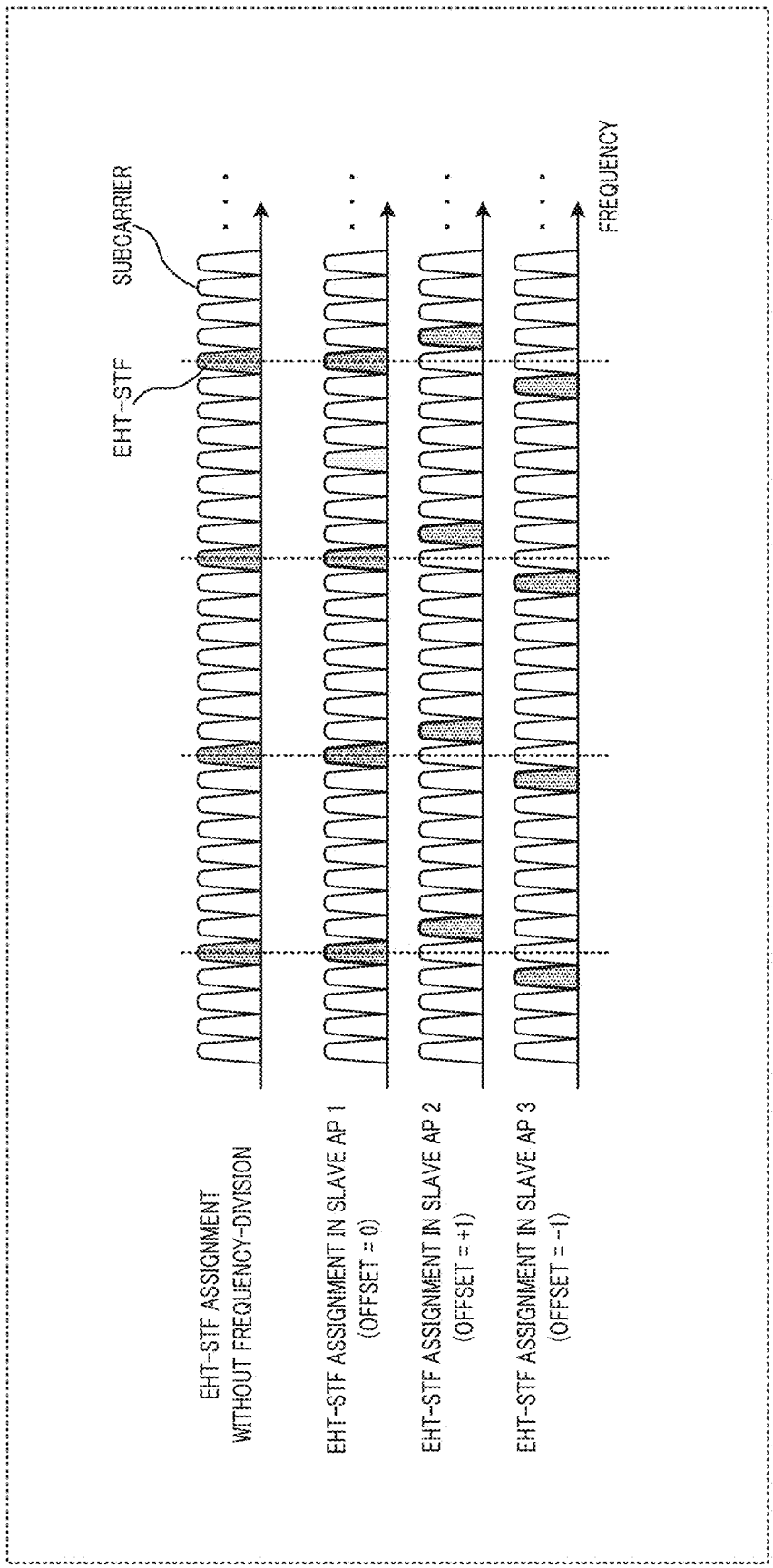
FIG. 9 illustrates frequency-allocation examples for EHT-STFs according to Method 3.

FIG. 9 illustrates frequency-allocation examples for EHT-STFs. In FIG. 9, for example, three Slave APs of Slave AP 1, Slave AP 2, and Slave AP 3 perform coordinated communication.

As illustrated in FIG. 9, in a case where EHT-STFs are not frequency-divided, the EHT-STFs are assigned at intervals of eight subcarriers in the frequency domain. Incidentally, a subcarrier interval at which an EHT-STF is assigned is not limited to eight subcarriers, and may be another interval (e.g., 16 subcarriers).

In Method 3, a Slave AP determines a subcarrier position to assign the EHT-STFs based on, for example, an offset with respect to a position of the subcarrier (i.e., frequency position) where the ETH-STFs not frequency-divided are assigned, the offset being different from an offset used by the other Slave APs. For example, as illustrated in FIG. 9, with respect to the positions of the subcarriers where the EHT-STFs not frequency-divided are assigned, an offset different for each of the Slave APs is added. For example, when the Slave AP number is not greater than the subcarrier interval of the EHT-STF, the offsets of the respective Slave APs may be set in the order of 0, 1, −1, 2, −2, and so forth.

For example, in the coordinated transmission, a Master AP may transmit, to the Slave APs, the MAP Trigger (FIG. 1) that includes an offset value (i.e., waveform-conversion parameter). Meanwhile, the subcarrier interval of the EHT-STF may be indicated from the Master AP to the Slave APs or may be defined in the standard, for example.

Further, the Master AP may also transmit, to the Slave APs, the MAP Trigger while including the Slave AP number. Alternatively, the Slave APs may determine the Slave AP number based on the order of Slave APs specified in the MAP Trigger.

Each Slave AP may determine frequency resources (e.g., subcarriers) to be allocated to the EHT-STFs and the EHT-LTFs of each Slave AP based on, for example, the waveform-conversion parameter indicated from the Master AP or the defined parameter.

For example, in FIG. 9, offset=0 is configured for Slave AP 1, offset=+1 is configured for Slave AP 2, and the offset=−1 is configured for Slave AP 1. This configuration of the offsets makes the subcarriers to which the EHT-LTFs of each of the Slave APs are assigned different from each other, as illustrated in FIG. 9. That is, in FIG. 9, signal waveforms of the EHT-STFs in the frequency domain transmitted by each of the Slave APs are different from each other. Consequently, according to Method 3, in the STA (e.g., radio communication apparatus 200), it is possible to reduce the variation in received power in the EHT-STFs transmitted from a plurality of Slave APs and thus to improve the AGC performance.

Further, in FIG. 9, the intervals of the frequency resources (e.g., subcarriers) at which the EHT-STFs of each of the Slave APs are assigned is identical to the subcarrier intervals at which the EHT-STFs are assigned in the case of no frequency-division (e.g., eight-subcarrier interval). In other words, the subcarrier intervals at which the respective Slave APs assign the EHT-STFs are identical to each other.

For example, in Method 1 (e.g., FIG. 6) and Method 2 (e.g., FIG. 7 or FIG. 8), the subcarrier intervals at which the EHT-STFs of each of the Slave APs are assigned (24 subcarriers) are N times (where "N" represents the number of Slave APs)) (three times) the subcarrier intervals at which the EHT-STFs not frequency-divided are assigned (eight subcarriers).

Thus, in Method 3, as compared with Method 1 and Method 2, it is possible to narrow the subcarrier intervals at which the EHT-STFs of each of the Slave APs are assigned. Accordingly, in Method 3, the length of repetition time of the EHT-STFs in the time domain can be increased as compared with Method 1 and Method 2, and thus, timing-detection performance in the STA can be improved.

Further, when the offsets to be configured for the respective Slave APs are, for example, 0, 1, −1, 2, −2, and so forth (i.e., when shifted by one subcarrier for an offset), a closer frequency to the EHT-STFs of each of the Slave APs (e.g., adjacent subcarrier) is allocated, and thus, it is made easier to sustain periodicity of a combined wave at the time of reception in the STA.

Incidentally, the offset to be configured for each of the Slave APs is not limited to this. For example, offset intervals to be configured for the Slave APs may be configured to be wider than those of when the offset intervals are, for example, 0, 1, −1, 2, −2, and so forth (i.e., when shifted by one subcarrier). Further, the offset values may be configured to a value obtained by rounding down "Subcarrier interval common in Slave APs/(Slave AP number)." In one example, when the subcarrier interval common in the Slave APs is eight subcarriers and the Slave AP number is three, the offset values become 0, 2, and −2.

For example, in the STA, a frequency-offset or a propagation delay may cause a shift of a subcarrier to which the EHT-STFs from each of the Slave APs are assigned. In contrast, due to the configuration of the offsets, when the shift of the subcarrier is less than the offset interval, the EHT-STFs transmitted from the each of the Slave APs are received at different frequencies in the STA, and thus, it is possible to suppress the deterioration of the AGC performance, for example.

<Method 4>

In 11ax, in transmission and reception by a plurality of transmit chains in an AP and an STA, Cyclic Shift Diversity (CSD) is employed in which a specific cyclic shift is added to a signal of each transmit chain (e.g., see NPL 4). The CSD can reduce, for example, variation in received power due to a phase of a propagation path.

Here, the transmit chain represents units of transmission and may correspond to, for example, an antenna (e.g., transmission antenna) or a stream.

In Method 4, a cyclic shift different for each of a plurality of transmission sources (e.g., Slave APs) is configured for the EHT-STFs. For example, a Slave AP adds, to the EHT-STFs, the cyclic shift value different from the cyclic shift value used by the other Slave APs for the EHT-STFs. With the cyclic-shift configuration, in the time domain, an offset is added to the EHT-STFs transmitted from each of the plurality of Slave APs.

FIG. 10 illustrates an exemplary cyclic shift (cyclic shift for space-time stream) number n to a total number of transmit chains (total number of space-time streams) (e.g., see NPL 4). The total number of transmit chains represents, for example, the sum of the number of transmit chains in each of the Slave APs performing coordinated communication.

As an example, when the number of Slave APs performing coordinated communication is two and each Slave AP has four transmit chains, in FIG. 10, in the row of the total number of transmit chains=8, cyclic shift value corresponding to one of cyclic shift numbers n=1 to 4 is configured for each transmit chain of AP 1, and cyclic shift value corresponding to one of cyclic shift numbers n=5 to 8 is configured for each transmit chain of AP 2. Note that, the cyclic shift value configured for each Slave AP is not limited to the example illustrated in FIG. 10.

For example, in coordinated communication, a Master AP may transmit, to Slave AP, a MAP Trigger (e.g., FIG. 1) including the number of transmit chains (or, the total number of transmit chains) of each Slave AP and a waveform-conversion parameter such as cyclic shift number n in the beginning of cyclic shift to be configured for each Slave AP. In the example illustrated in FIG. 10, the MAP Trigger may include the number of transmit chains=4 of each of AP 1 and AP 2 (or, number of transmit chains=8), the cyclic shift number n=1 in the beginning of AP 1, and the cyclic shift number n=5 in the beginning of AP 2. With this indication by the MAP Trigger, Slave APs can apply the cyclic shifts configured for the respective Slave APs (and each of transmit chains) to the EHT-STFs.

In Method 4, the cyclic shift values provided to reference signals (e.g., EHT-STFs) transmitted in transmit chains of the respective Slave APs are different from each other. In other words, in Method 4, signal waveforms of the reference signals (e.g., EHT-STFs) in the time domain transmitted by each of the Slave APs are different from each other. Consequently, according to Method 4, in the STA (e.g., radio communication apparatus 200), it is possible to reduce the variation in received power in the EHT-STFs transmitted from a plurality of Slave APs and thus to improve the AGC performance.

In addition, according to Method 4, even when the CSD for the EHT-STFs is applied among the plurality of Slave APs, the Slave APs can identify, by indication from the Master AP (e.g., MAP Trigger), the cyclic shifts to be provided to the transmit chains of the respective Slave APs Although FIG. 10 illustrates, as an example, the cyclic shift value in which the total number of transmit chains is defined up to eight, but the cyclic shift supporting nine or greater number of transmit chains may be defined.

<Method 5>

In Method 5, for example, a format (i.e., transmission method or waveform-conversion method) of a reference signal (EHT-STF and EHT-LTF) is switched based on information on an STA or information on an AP.

In one example, depending on formats of an EHT-STF and an EHT-LTF, waveforms of the EHT-STF and the EHT-LTF may vary, and the AGC performance or timing-detection accuracy in the EHT-STF and the EHT-LTF may thus vary.

Figure 11:
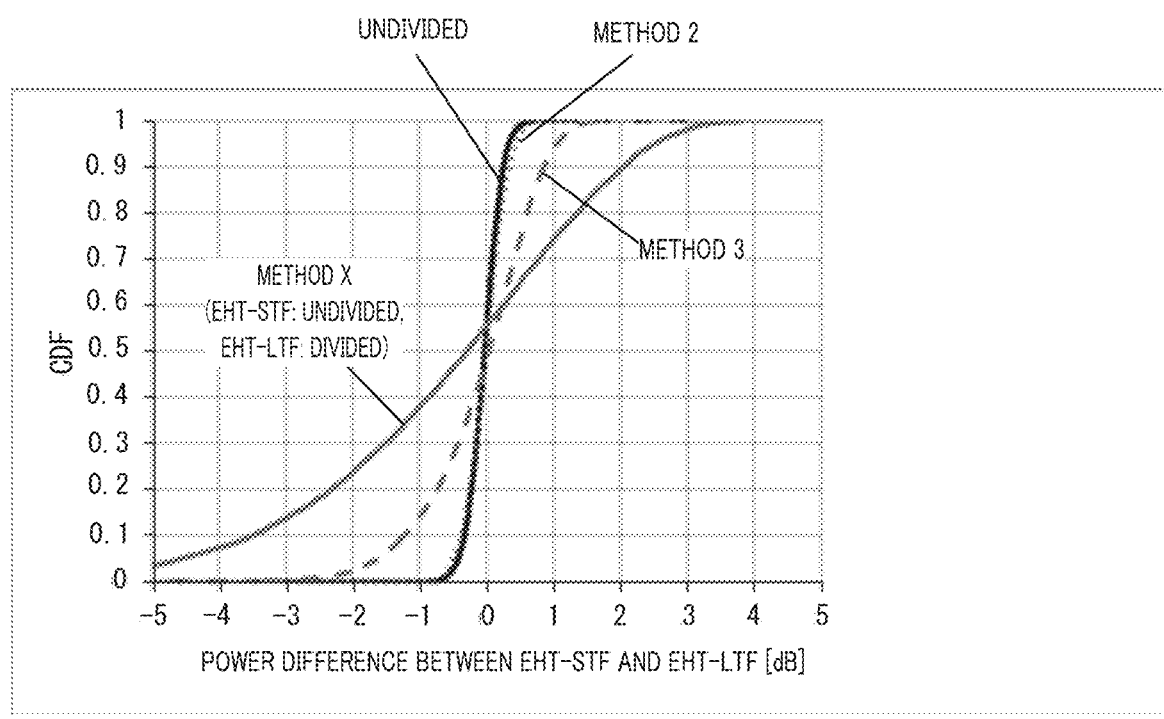
FIG. 11 illustrates an exemplary probability distribution of a power difference between an EHT-STF and an EHT-LTF.

FIG. 11 illustrates an exemplary probability distribution of a power difference [dB] between an EHT-LTF and an EHT-STF derived from computer simulation by the inventors of the present application. In FIG. 11, a horizontal axis indicates the power difference [dB] between the EHT-LTF and the EHT-STF, and a vertical axis indicates a Cumulative Distribution-Function (CDF).

In FIG. 11, "undivided" indicates characteristics in a case of a format in which both the EHT-STF and the EHT-LTF are not frequency-divided. Further, "Method X" indicates characteristics in a case of a format in which the EHT-STF is not frequency-divided whereas the EHT-LTF is frequency-divided (e.g., FIG. 2). "Method 2" indicates characteristics in a case of a format in which the EHT-STF and the EHT-LTF are frequency-divided based on Method 2 described above (e.g., FIG. 7), and "Method 3" indicates characteristics in a case of a format in which the EHT-STF and the EHT-LTF are frequency-divided based on Method 3 described above (e.g., FIG. 9).

In FIG. 11, for example, the smaller the probability distribution of the power difference between the EHT-STF and the EHT-LTF is (e.g., closer to 0 dB), the better characteristics (i.e., AGC performance) are indicated with respect to variation in received power in an STA. For example, as illustrated in FIG. 11, Method 2 and Method 3 present the better characteristics compared to "Method X." Further, Method 2 presents the same characteristics as in the case of "undivided" and presents the better characteristics compared to Method 3.

The power difference between the EHT-STF and the EHT-LTF illustrated in FIG. 11 corresponds to, for example, variation in EHT-STF, EHT-LTF, and received power, that is, the AGC performance. Thus, FIG. 11 indicates that the AGC performance is better in Method 2 and Method 3 than in Method X. FIG. 11 also indicates that the cases of Method 2 and "undivided" present the similar AGC performance, and indicates that the AGC performance is better in Method 2 than in Method 3.

Figure 12:
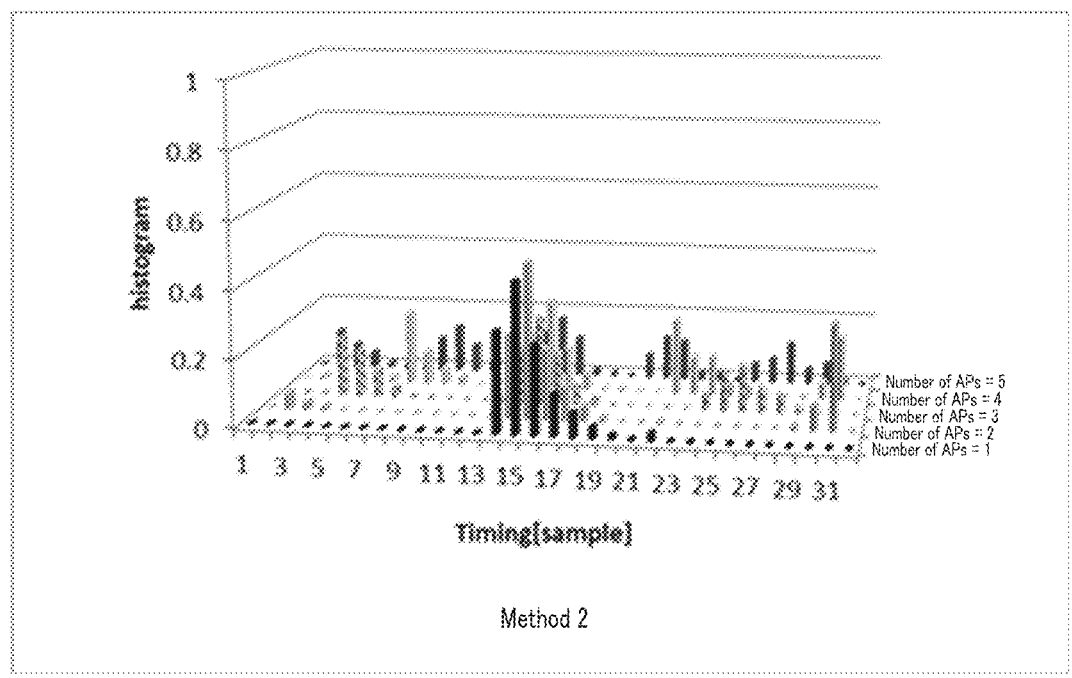
FIG. 12 illustrates an example of a timing-detection result according to Method 2.
Figure 13:
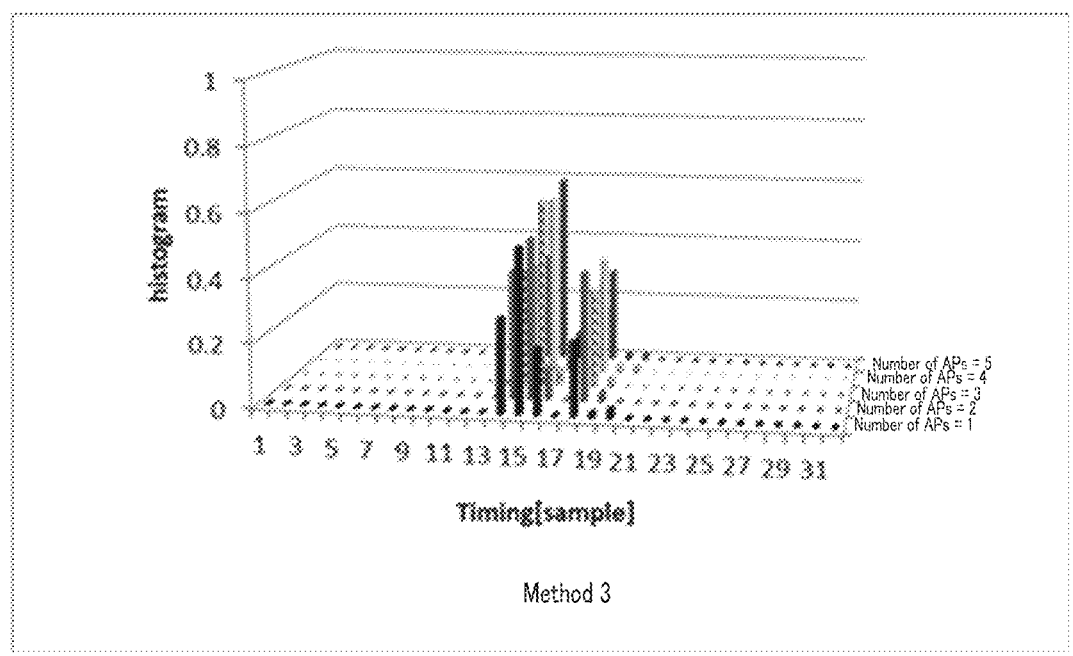
FIG. 13 illustrates an example of a timing-detection result according to Method 3.

Next, FIGS. 12 and 13 illustrate an example of a timing-detection result of each of Method 2 and Method 3 obtained by the computer simulation by the inventor of the present application. Incidentally, in FIGS. 12 and 13, the characteristics when the number of APs=1 present the similar characteristics to the timing-detection result in the case of "undivided." Hence, in FIGS. 12 and 13, the timing-detection in the number of APs=1 is an expected value. For example, even when the number of APs is increased, as a timing of the same position as the number of APs=1 is detected, the timing-detection accuracy becomes high.

Comparing FIG. 12 and FIG. 13, in Method 3, for example, even when the number of APs is increased, the timing of the same position as the expected value is detected, and thus, the timing-detection accuracy is high as compared to Method 2.

Incidentally, in a case of "Method X," i.e., in case of no frequency-division of the EHT-STF, for example, as in Method 3 (e.g., FIG. 9), since the subcarriers interval at which the EHT-STFs of each of the Slave APs are assigned is narrow as compared to Method 2, the length of repetition time of the EHT-STFs in the time domain can be increased, and thus, the timing-detection performance in the STA can be improved. Therefore, for example, the timing-detection accuracy is higher in (Method 3 and Method X) than in Method 2.

FIG. 14 illustrates a summarizing example of power differences (i.e., AGC-performance) between EHT-STFs and EHT-LTFs and timing-detection accuracy in Method X, Method 2, and Method 3.

As illustrated in FIG. 14, characteristic of the AGC performance and the timing-detection accuracy vary depending on the formats of the EHT-STF and the EHT-LTF (i.e., the transmission method or waveform-conversion method). For example, focusing on the AGC performance, Method 2 is more suitable than Method X and Method 3. On the other hand, for example, focusing on the timing-detection accuracy, Method X or Method 3 is suitable than Method 2.

Meanwhile, for example, the allowable power difference between the EHT-STF and the EHT-LTF in the STA may vary depending on equipment. Note that, for example, when the timing can be detected by the L-STF in the STA, the STA may not detect the timing based on the EHT-STF.

Thus, a suitable format of a reference signal (i.e., waveform-conversion method) may vary depending on an STA.

Accordingly, in Method 5, the format of the EHT-STF or the EHT-LTF is determined based on the performance (i.e., specification or capability) of each of the STAs.

For example, each of the STAs may determine the format of the EHT-STF or the EHT-LTF. That is, the format of the EHT-STF or the EHT-LTF may be switched in the STAs.

For example, in an STA, the wider the dynamic range with respect to the received signal, the wider the range that allows the variation in received power difference, and thus, the AGC performance is less likely to be deteriorated. Thus, for example, in the STA, when the dynamic range with respect to the received signal is wider (e.g., when dynamic range is not less than threshold value), in FIG. 14, the format of Method X or Method 3 having the higher timing-detection accuracy may be applied regardless of the performance regarding the power difference between the EHT-STF and the EHT-LTF. On the other hand, for example, in the STA, when the dynamic range with respect to the received signal is narrower (e.g., when dynamic range is less than threshold value), the format of Method 2 or Method 3 having the better performance regarding the power difference between the EHT-STF and the EHT-LTF may be applied in FIG. 14.

Further, for example, in the STA, when the timing-detection based on the EHT-STF is not performed, in FIG. 14, the format of Method 2 or Method 3 having the better performance regarding the power difference between the EHT-STF and the EHT-LTF may be applied regardless of the timing-detection performance. On the other hand, for example, in the STA, when the timing-detection based on the EHT-STF is performed, in FIG. 14, the format of Method X or Method 3 having the higher timing-detection accuracy may be applied.

By way of example, the STA may determine the format of Method X (e.g., FIG. 2 or FIG. 3) when the dynamic range with respect to the received signal is wider and the timing-detection based on the EHT-STF is performed. The STA may determine the format of Method 3 (e.g., FIG. 9) when the dynamic range with respect to the received signal is narrower and the timing-detection based on the EHT-STF is performed. Further, the STA may determine the format of Method 2 (e.g., FIG. 7) when the timing-detection based on the EHT-STF is not performed regardless of the dynamic range with respect to the received signal.

The STA may indicate, to the APs, the determined format of the EHT-STF. For example, at least one of the Association Request and the Reassociation Request, or other control information may be used for indicating the format of the EHT-STF. As an example, FIG. 15 illustrates an example in which the format of the EHT-STF is added to a table of the Association Request (e.g., see NPL 5).

A case has been described above where the STA determines (i.e., switches or selects) the format of the EHT-STF, the format of the EHT-STF may be determined by the APs. For example, the APs may determine the format based on information related to an ability (e.g., capability) of the STA to be indicated by the STA. In this case, the APs may indicate, by, for example, a MAP NDPA (e.g., FIG. 1), the selected format of the EHT-STF to the STA.

Alternatively, the format of the EHT-STF may be determined based on, for example, the number of Slave APs performing coordinated communication. For example, as illustrated in FIG. 12, even in the format of Method 2, when the number of Slave APs is small (e.g., when two or less), deterioration of the timing-detection accuracy is small as compared with the case where the number of Slave APs is large (e.g., when two or more). Thus, for example, the APs may determine the format of Method 2 when the number of Slave APs is not greater than a threshold value (e.g., two) and may determine the format of Method X or Method 3 when the number of Slave APs is greater than the threshold value (e.g., two). The AP may indicate, by, for example, the MAP NDPA (e.g., FIG. 1), the selected format of the EHT-STF to the STA.

Thus, according to Method 5, the AGC performance and the timing-detection accuracy in the EHT-STF and the EHT-LTF can be improved by determining (or switching) the format of the EHT-STF based on the STA performance or the number of APs.

In Method 5, as illustrated in FIG. 14, Method 2 and Method 3 have been described, but the method applied to the EHT-STF format is not limited to Method 2 and Method 3, and Method 1 and Method 4 may be applied. For example, since Method 1 and Method 2 have the same format of the EHT-STF, the timing-detection accuracy of Method 1 becomes the same as in Method 2. Alternatively, instead of the format of the EHT-STF applied to the above-mentioned example, Method 4 may be applied.

<Method 6>

For example, in Methods 1 to 5, it is assumed that the format of the EHT-STF in the time domain is one symbol. In Method 6, a case will be described where the format of the EHT-STF in the time domain is a plurality of symbols (e.g., two symbols).

As illustrated in FIG. 14, Method X or Method 3 have the better timing-detection performance than Method 2 has, whereas Method 2 has the better the power difference between the EHT-STF and the EHT-LTF (i.e., AGC performance) than Method X and Method 3 have.

Thus, for the first symbol of the symbols constituting the EHT-STF (e.g., two symbols), the format of Method X (or Method 3) may be configured, and the format of Method 2 may be applied to the second symbol.

In other words, for example, a Slave AP transmits, in the first symbol of the two symbols constituting the EHT-STF, the EHT-STF having the same waveform among the plurality of Slave APs performing coordinated communication. That is, the Slave AP, for example, in the first symbol, transmits the EHT-STF having the same waveform as that of the EHT-STFs transmitted by the other Slave APs. With this configuration of the EHT-STF, the timing-detection accuracy can be improved in the first symbol.

The Slave AP transmits, in the second symbol, the EHT-STF in a frequency resource overlapping at least a part of frequency resources (e.g., subcarriers) different for each of the Slave APs and to which the EHT-LTF is assigned in the Slave AP. In other words, the Slave AP, for example, in the second symbol, transmits the EHT-STF in the subcarrier overlapping at least a part of the subcarrier to which the Slave AP assigns the EHT-LTF. With this configuration of the EHT-STF, the AGC performance can be improved in the second symbol. Further, for example, in Method 2, as illustrated in FIG. 7, the EHT-LTFs among the plurality of Slave APs are not combined, and thus, it is possible to reduce the variation in received power in the EHT-LTFs and to improve the AGC performance.

Further, for example, the AGC performance in the EHT-LTF can be improved by applying the format of Method 2 to the second symbol of the EHT-STF of two symbols closer to the EHT-LTF.

Thus, according to Method 6, in the STA, it is possible to reduce the variation in received power and to improve the timing-detection accuracy, and thus, system-improving effects by the downlink coordinated communication can be enhanced.

The number of symbols constituting the EHT-STF may be three or more symbols.

Moreover, for the first symbol of the two symbols constituting the EHT-STF, a format for improving the timing-detection accuracy (e.g., Method 3 or Method 4) may be configured, not limited to Method X. Furthermore, for the second symbol of the two symbols constituting the EHT-STF, a format for improving the AGC performance (e.g., Method 1 or Method 4) may be configured, not limited to Method 2.

<Method 7>

For example, in FIG. 10, the cyclic shift value in which the total number of transmit chains is defined up to eight. Thus, in order to configure cyclic shift value different for each transmit chain when the total number of transmit chains is nine or more, for example, a new definition of cyclic shift value corresponding to nine or greater total number of transmit chains (i.e., an extension of definition) is assumed.

However, for the cyclic shift value, in order to allow greater total number of transmit chains, phase shift amount in each total number of transmit chain will be made smaller or the maximum phase shift amount will be made larger; as a result, an effect of the cyclic shift (e.g., effect in variation reduction of received power due to phase of propagation path) may be reduced.

Thus, Method 7 will describe a method for determining a format of an EHT-STF for greater total number of transmit chains (e.g., for nine or more) without extending the definition of the cyclic shift value.

For example, in a case where the total number of transmit chains (or antennae) through which the EHT-STFs are transmitted in a plurality of APs is not greater than a threshold value (e.g., eight), the APs (e.g., Slave APs) perform the waveform-conversion (e.g., application of cyclic shift) according to Method 4. That is, the APs generate EHT-STFs having waveforms different in the time domain among the plurality of APs when the total number of transmit chains is not greater than the threshold value.

On the other hand, in a case where the total number of transmit chains (or antennae) through which the EHT-STFs are transmitted in a plurality of APs is greater than the threshold value (e.g., eight), the APs (e.g., Slave APs) make the waveforms of the EHT-STFs different, in both of the time domain and the frequency domain, from those of the EHT-STFs transmitted by the other Slave APs to the STAs. That is, the APs use in combination waveform-conversion in both of the time domain and the frequency domain. For example, the APs may use the formats of Method 4 and Method 3 in combination.

In this case, for example, a MAP Trigger (e.g., FIG. 1) may include "the total number of transmit chains in each Slave AP" and "beginning cyclic shift number" in each Slave AP in Method 4, and "offset value" to each Slave AP in Method 3. This processing allows the Slave APs to identify, by indication from the Master AP (e.g., MAP Trigger), cyclic shifts to be provided to the transmit chains of each of the Slave APs and the offset values of the subcarriers to which the EHT-STFs are assigned in each of the Slave APs.

According to Method 7, even when the total number of transmit chains in the plurality of APs is greater than the threshold value (e.g., eight), the waveforms of the reference signals (e.g., EHT-STFs and EHT-LTFs) in at least one of the time domain and the frequency domain can be made different for each of the APs, for example. Thus, according to Method 7, for example, even when the total number of transmit chain is nine or more in FIG. 10, in the STA (e.g., radio communication apparatus 200), it is possible to reduce the variation in received power in the EHT-STFs and EHT-LTFs transmitted from a plurality of Slave APs and thus to improve the AGC performance.

Incidentally, for example, a method of waveform-conversion in the frequency domain used in combination with Method 4 (i.e., waveform-conversion in time domain) is not limited to Method 3, and may be Method 1 or Method 2.

Further, for example, when the total number of transmit chains is greater than the threshold value (e.g., nine) in not a Multi-AP case (e.g., in case of single-AP), the waveform-conversion in the time domain and the frequency domain may be used in combination as in Method 7.

Methods 1 to 7 have been each described, thus far.

Thus, in the present embodiment, radio communication control apparatus 100 (e.g., APs) generates reference signals (EHT-STFs or EHT-LTFs) having waveforms different between a plurality of radio communication control apparatuses 100 that performs coordinated communication with respect to radio communication apparatus 200 (STA(s)), and transmits the generated reference signals. With this transmission of the reference signals, for example, in the downlink coordinated communication, radio communication control apparatus 100 can appropriately transmit the reference signals, the variation in received power in radio communication apparatus 200 can be suppressed, and thus, the AGC performance can be improved.

An Embodiment of the present disclosure has been described, thus far.

In the above embodiment, exemplary waveform-conversion for a preamble reference signal of an NDP has been described as an example, an exemplary embodiment of the present disclosure may be applied to a preamble reference signal of another packet different from the NDP (e.g., joint transmission-PPDU including data).

In the embodiment described above, an example has been described in which a plurality of APs perform coordinated communication with respect to STAs, but the present disclosure is not limited to this example. At least some of the plurality of APs, for example, may be replaced with STA(s). The present disclosure, for example, may be applied to a case where one or more APs and one or more STAs perform coordinated communication with respect to another STA. Alternatively, the present disclosure may be applied to a case where two or more STAs perform coordinated communication with respect to another STA.

In the embodiment described above, a case has been described where reference signals having waveforms different from each other are transmitted among a plurality of transmission sources (e.g., Slave APs) in coordinated communication. However, the present disclosure is not limited to this case. For example, among the plurality of transmission sources, waveforms of reference signals (i.e., allocation of frequency domain, offset, cyclic shift, and the like) may be different in some of the transmission sources whereas waveforms of reference signals may be identical in the other transmission sources. Even in this case, compared with the case where the plurality of transmission sources in coordinated communication transmits reference signals of the same waveforms, the variation in received power in STA(s) can be suppressed, and thus, the AGC distortion can be suppressed.

In the embodiment described above, a case has been described where the number of Slave APs performing coordinated communication is three, but the number of APs is not limited to three, and may be another number.

Further, subcarriers may be also referred to as tones. The units of frequency resource are not limited to the subcarriers, but may be other resource units. The subcarrier interval at which reference signal is assigned in the embodiment described above is an example, and may be another interval.

The terminology used to describe each signal (e.g., each packet) in the above embodiment is exemplary, and the present disclosure is not limited to this example.

In addition, the term, such as "part" or "portion" or the term ending with a suffix, such as "-er" "-or" or "-ar" in the above-described embodiment may be replaced with another term, such as "circuit (circuitry)," "device," "unit," or "module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can further be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may further include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control sign further data signals which are used by a communication device performing a communication function of the communication apparatus.

The communication apparatus further may include an infrastructure facility, such as a base station, an access point, and any other apparatus, device or system that communicates with or controls apparatuses such as those in the above non-limiting examples.

A radio communication control apparatus according to one example of the present disclosure includes: control circuitry, which, in operation, makes, a waveform of a reference signal to be transmitted in coordination with a second radio communication control apparatus to a radio communication apparatus, different, in at least one of a frequency domain and a time domain, from a waveform of the reference signal to be transmitted by the second radio communication control apparatus to the radio communication apparatus; and transmission circuitry, which, in operation, transmits the reference signal.

In the radio communication control apparatus according to one example of the present disclosure, the reference signal includes a short training field (STF) signal, and a first frequency resource to which the STF signal is assigned in the first radio communication control apparatus is different from a second frequency resource to which the STF signal is assigned in the second radio communication control apparatus.

In the radio communication control apparatus according to one example of the present disclosure, the reference signal includes a long training field (LTF) signal, a third frequency resource to which the LTF signal is assigned in the first radio communication control apparatus is different from a fourth frequency resource to which the LTF signal is assigned in the second radio communication control apparatus, and the third frequency resource overlaps at least a part of the first frequency resource.

In the radio communication control apparatus according to one example of the present disclosure, the third frequency resource and the fourth frequency resource are each determined based on a number of radio communication control apparatuses related to coordinated communication.

In the radio communication control apparatus according to one example of the present disclosure, an interval of a frequency resource at which the first radio communication control apparatus assigns the reference signal is identical to an interval of a frequency resource at which the second radio communication control apparatus assigns the reference signal, and the control circuitry determines a second frequency position to assign the reference signal based on an offset with respect to a first frequency position of the interval, the offset being different from an offset used by the second radio communication control apparatus.

In the radio communication control apparatus according to one example of the present disclosure, the control circuitry adds, to the reference signal, a cyclic shift value different from a cyclic shift value used by the second radio communication control apparatus for the reference signal.

In the radio communication control apparatus according to one example of the present disclosure, the reference signal includes a short training field (STF) signal, and a format corresponding to the waveform of the SFT signal is based on information related to the radio communication apparatus.

In the radio communication control apparatus according to one example of the present disclosure, the format is determined in the radio communication apparatus.

In the radio communication control apparatus according to one example of the present disclosure, the control circuitry determines the format based on information related to a capability of the radio communication apparatus.

In the radio communication control apparatus according to one example of the present disclosure, the reference signal includes a short training field (STF) signal, and a format corresponding to the waveform of the STF signal is based on a number of radio communication control apparatuses related to coordinated communication.

In the radio communication control apparatus according to one example of the present disclosure, the reference signal includes a short training field (STF) signal and a long training field (LTF) signal, and the transmission circuitry, among a plurality of symbols constituting the STF signal, transmits, in the first symbol, the STF signal having a waveform identical to that of the STF signal to be transmitted by the second radio communication control apparatus, and transmits, in the second symbol, the STF signal in a frequency resource overlapping at least a part of a frequency resource to which the first radio communication control apparatus assigns the LTF signal.

In the radio communication control apparatus according to one example of the present disclosure, the second symbol is a symbol closer to the LTF signal than the first symbol is.

In the radio communication control apparatus according to one example of the present disclosure, the control circuitry makes the waveform of the reference signal different, in both of the frequency domain and the time domain, from the waveform of the reference signal to be transmitted by the second radio communication control apparatus to the radio communication apparatus, in a case where a total number of antennae through which the reference signal is transmitted is greater than a threshold value.

A radio communication control method according to one example of the present disclosure includes: making, by a first radio communication control apparatus, a waveform of a reference signal to be transmitted in coordination with a second radio communication control apparatus to a radio communication apparatus, different, in at least one of a frequency domain and a time domain, from a waveform of the reference signal to be transmitted by the second radio communication control apparatus to the radio communication apparatus: and transmitting, by the first radio communication control apparatus, the reference signal.

The disclosure of Japanese Patent Application No. 2019-199720, filed on Nov. 1, 2019, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST 10, 100 Radio communication control apparatus
11 Controller
12 Transmitter
101 Reference signal generator
102 Transmission packet generator
103 Transmission packet generator
104 Radio transceiver
105 Reception packet decoder
200 Radio communication apparatus

The invention claimed is:

1. A radio communication control apparatus referred to as a first radio communication control apparatus, comprising:
control circuitry, which, in operation, makes, a waveform of a reference signal to be transmitted in coordination with a second radio communication control apparatus to a radio communication apparatus, different, in at least one of a frequency domain and a time domain, from a waveform of the reference signal to be transmitted by the second radio communication control apparatus to the radio communication apparatus; and
transmission circuitry, which, in operation, transmits the reference signal, wherein,
the control circuitry makes the waveform of the reference signal different, in both of the frequency domain and the time domain, from the waveform of the reference signal to be transmitted by the second radio communication control apparatus to the radio communication apparatus, in a first case where a total number of antennas through which the reference signal is transmitted is greater than a threshold value, and
the control circuitry makes the waveform of the reference signal different, not in the frequency domain but in the time domain from the waveform of the reference signal to be transmitted by the second radio communication control apparatus to the radio communication apparatus, in a second case where the total number of antennas through which the reference signal is transmitted is not greater than the threshold value.

2. The radio communication control apparatus according to claim 1, wherein:
the reference signal includes a short training field (STF) signal, and
a first frequency resource to which the STF signal is assigned in the first radio communication control apparatus is different from a second frequency resource to which the STF signal is assigned in the second radio communication control apparatus.

3. The radio communication control apparatus according to claim 2, wherein:
the reference signal includes a long training field (LTF) signal,
a third frequency resource to which the LTF signal is assigned in the first radio communication control apparatus is different from a fourth frequency resource to which the LTF signal is assigned in the second radio communication control apparatus, and
the third frequency resource overlaps at least a part of the first frequency resource.

4. The radio communication control apparatus according to claim 3, wherein the third frequency resource and the fourth frequency resource are each determined based on a number of radio communication control apparatuses related to coordinated communication.

5. The radio communication control apparatus according to claim 1, wherein:
an interval of a frequency resource at which the first radio communication control apparatus assigns the reference signal is identical to an interval of a frequency resource at which the second radio communication control apparatus assigns the reference signal, and
the control circuitry determines a second frequency position to assign the reference signal based on an offset with respect to a first frequency position of the interval, the offset being different from an offset used by the second radio communication control apparatus.

6. The radio communication control apparatus according to claim 1, wherein the control circuitry adds, to the reference signal, a cyclic shift value different from a cyclic shift value used by the second radio communication control apparatus for the reference signal.

7. The radio communication control apparatus according to claim 1, wherein:
the reference signal includes a short training field (STF) signal, and
a waveform conversion method of the waveform of the STF signal is based on information related to the radio communication apparatus.

8. The radio communication control apparatus according to claim 7, wherein the waveform conversion method is determined in the radio communication apparatus.

9. The radio communication control apparatus according to claim 7, wherein the control circuitry determines the waveform conversion method based on information related to a capability of the radio communication apparatus.

10. The radio communication control apparatus according to claim 1, wherein:
the reference signal includes a short training field (STF) signal, and
a waveform conversion method of the waveform of the STF signal is based on a number of radio communication control apparatuses related to coordinated communication.

11. The radio communication control apparatus according to claim 1, wherein:
the reference signal includes a short training field (STF) signal and a long training field (LTF) signal, and
the transmission circuitry, among a plurality of symbols constituting the STF signal, transmits, in the first symbol, the STF signal having a waveform identical to that of the STF signal to be transmitted by the second radio communication control apparatus, and transmits, in the second symbol, the STF signal in a frequency resource overlapping at least a part of a frequency resource to which the first radio communication control apparatus assigns the LTF signal.

12. The radio communication control apparatus according to claim 11, wherein the second symbol is a symbol closer to the LTF signal than the first symbol is.

13. A radio communication control method, comprising:
making, by a first radio communication control apparatus, a waveform of a reference signal to be transmitted in coordination with a second radio communication control apparatus to a radio communication apparatus, different, in at least one of a frequency domain and a time domain, from a waveform of the reference signal to be transmitted by the second radio communication control apparatus to the radio communication apparatus; and
transmitting, by the first radio communication control apparatus, the reference signal, wherein, the waveform of the reference signal is made different, in both of the frequency domain and the time domain, from the waveform of the reference signal to be transmitted by the second radio communication control apparatus to the radio communication apparatus, in a first case where a total number of antennas through which the reference signal is transmitted is greater than a threshold value, and the waveform of the reference signal is made different, not in the frequency domain but in the time domain from the waveform of the reference signal to be transmitted by the second radio communication control apparatus to the radio communication apparatus, in a second case where the total number of antennas through which the reference signal is transmitted is not greater than the threshold value.

\* \* \* \* \*